United States Patent
Takahashi et al.

(10) Patent No.: US 7,633,209 B2
(45) Date of Patent: Dec. 15, 2009

(54) DRIVING DEVICE CAPABLE OF OBTAINING A STABLE FREQUENCY CHARACTERISTIC

(75) Inventors: Soumei Takahashi, Tokyo (JP); Takahiko Nishiyama, Kanagawa (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 57 days.

(21) Appl. No.: 12/082,939

(22) Filed: Apr. 15, 2008

(65) Prior Publication Data
US 2008/0258578 A1 Oct. 23, 2008

(51) Int. Cl.
*H01L 41/08* (2006.01)
*H02N 2/00* (2006.01)

(52) U.S. Cl. .............. 310/323.17; 310/12; 310/323.01; 310/328

(58) Field of Classification Search ............ 310/12, 310/323.01, 323.02, 323.08, 323.09, 323.16, 310/323.17, 328
See application file for complete search history.

(56) References Cited

U.S. PATENT DOCUMENTS

| | | | |
|---|---|---|---|
| 5,225,941 A | 7/1993 | Saito et al. | |
| 5,589,723 A | 12/1996 | Yoshida et al. | |
| 5,890,391 A | 4/1999 | Okada | |
| 6,188,161 B1 | 2/2001 | Yoshida et al. | |
| 6,856,072 B2 * | 2/2005 | Kosaka et al. | 310/323.02 |
| 7,157,830 B2 * | 1/2007 | Jansson et al. | 310/317 |
| 7,173,363 B2 * | 2/2007 | Hendriks et al. | 310/328 |
| 7,355,325 B2 * | 4/2008 | Johansson et al. | 310/328 |
| 7,355,802 B2 * | 4/2008 | Homme | 359/824 |
| 2005/0275315 A1 | 12/2005 | Manabe et al. | |
| 2006/0103266 A1 * | 5/2006 | Okamoto | 310/328 |
| 2007/0036533 A1 | 2/2007 | Sasaki | |
| 2007/0096601 A1 * | 5/2007 | Sueyoshi et al. | 310/328 |
| 2008/0258579 A1 * | 10/2008 | Yamada et al. | 310/328 |
| 2008/0265136 A1 * | 10/2008 | Tanaka et al. | 250/206.1 |
| 2008/0265806 A1 * | 10/2008 | Tanaka et al. | 318/116 |
| 2008/0297000 A1 * | 12/2008 | Nishiyama et al. | 310/323.02 |

(Continued)

FOREIGN PATENT DOCUMENTS

EP 1 605 290 A2 12/2005

(Continued)

OTHER PUBLICATIONS

U.S. Appl. No. 12/082,947, filed Apr. 15, 2008, Entitled "Driving Device Capable of Improving a Shock and Vibration Resistance Thereof" Inventor: Nishiyama et al.

(Continued)

*Primary Examiner*—Thomas M Dougherty
(74) *Attorney, Agent, or Firm*—Frishauf, Holtz, Goodman & Chick, P.C.

(57) ABSTRACT

A driving device includes an electro-mechanical transducer having first and second end portions opposite to each other in an expansion/contraction direction, a static member coupled to the first end portion of the electro-mechanical transducer, a vibration friction portion coupled to the second end portion of the electro-mechanical transducer, and a rod-shaped moving portion frictionally coupled to the vibration friction portion, whereby moving the moving portion in the expansion/contraction direction of the electro-mechanical transducer. The driving device is covered with a cabinet. An elastic member lies between the cabinet and the static member.

5 Claims, 8 Drawing Sheets

U.S. PATENT DOCUMENTS

2008/0297004 A1* 12/2008 Yamada et al. ............... 310/329

FOREIGN PATENT DOCUMENTS

| EP | 1 755 176 A2 | 2/2007 |
|---|---|---|
| JP | 6-174999 A | 6/1994 |
| JP | 7-49442 A | 2/1995 |
| JP | 2633066 B2 | 4/1997 |
| JP | 9-191665 A | 7/1997 |
| JP | 10-337057 A | 12/1998 |
| JP | 3002890 B2 | 11/1999 |
| JP | 3141714 B2 | 12/2000 |
| JP | 3171000 B2 | 3/2001 |
| JP | 3180557 B2 | 4/2001 |
| JP | 3212225 B2 | 7/2001 |
| JP | 3218851 B2 | 8/2001 |
| JP | 2003-185406 A | 7/2003 |
| JP | 2005-218244 A | 8/2005 |
| JP | 2006-5998 A | 1/2006 |
| JP | 2006-54979 A | 2/2006 |
| JP | 2006-113155 A | 4/2006 |
| JP | 2006-113874 A | 4/2006 |
| JP | 2006-304529 A | 11/2006 |

OTHER PUBLICATIONS

U.S. Appl. No. 12/082,948, filed Apr. 15, 2008, Entitled: "Driving Device Capable of Transferring Vibrations Generated by an Electro-Mechanical Transducer to a Vibration Friction Portion with a High Degree of Efficiency" Inventor: Yamada et al.

U.S. Appl. No. 12/148,252, filed Apr. 17, 2008, Entitled "Driving Device Having Suitable Stationary Member as Material" Inventor: Yamada et al.

U.S. Appl. No. 12/148,257, filed Apr. 17, 2008, Entitled "Driving Device Capable of Reducing Height Thereof" Inventor: Yamada et al.

U.S. Appl. No. 12/148,253, filed Apr. 17, 2008, Entitled "Method of Driving Device" Inventor: Tanaka et al.

U.S. Appl. No. 12/148,793, filed Apr. 22, 2008, Entitled "Position Detecting Device Capable of Improving Detection Accuracy" Inventor: Tanaka et al.

Extended European Search Report dated Sep. 9, 2008 issued in European Application No. 08154985.9-2213 (which is a counterpart of related U.S. Appl. No. 12/148,793).

* cited by examiner

DRIVING DEVICE CAPABLE OF OBTAINING A STABLE FREQUENCY CHARACTERISTIC

This application is based upon and claims the benefit of priority from Japanese Patent Application JP 2007-107754, filed on Apr. 17, 2007, the disclosure of which is incorporated herein in its entirety by reference.

BACKGROUND OF THE INVENTION

This invention relates to a driving device (a linear actuator) and, in particular, to a driving device where an electro-mechanical transducer such a piezoelectric element is used as a driving source of the driving device (the linear actuator).

Previously, linear actuators (driving devices) using electromechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element. Japanese Patent No. 3180557 (JP-B 3180557) (which will be also called a third patent document), which corresponds also to U.S. Pat. No. 5,589,723, discloses a driving apparatus including the friction member composed of a metal and the driving member made of a fiber-reinforced resin composite.

Japanese Unexamined Patent Application Publication No. 2006-54979 (JP-A 2006-54979) (which will be also called a fourth patent document) discloses an actuator which is capable of moving a driven member with stability and with precision. The actuator disclosed in JP-A 2006-54979 comprises a first piezoelectric element, a diving member mounted to the first piezoelectric element, a driven member which is frictionally coupled to the driving member and which extends in a driving direction, and a second piezoelectric element for engaging the driving member with the driven member and for releasing a friction engagement between the driving member and the driven member. Specifically, the actuator disclosed in JP-A 2006-54979 comprises a pair of first piezoelectric elements for driving, a second piezoelectric element for engagement, a pair of driving members, and a pressure spring. The pair of first piezoelectric elements and the pair of driving members are disposed at both sides with the driven member sandwiched between them. The pair of driving members have a distance which is expanded or narrowed by the second piezoelectric element. By the second piezoelectric element, the friction engagement between the pair of the driving members and the driven member is ensured or released.

Japanese Unexamined Patent Application Publication No. H9-191665 (JP-A 9-191665) (which will be also called a fifth patent document), which corresponds to U.S. Pat. No. 5,890,391, discloses a linear drive mechanism using an electromechanical conversion element which is insensitive to elastic deformation of a constituent member. The linear driving mechanism disclosed in JP-A 9-191665 comprises the electromechanical conversion element, a working member which is fixedly connected to the electromechanical conversion element and which displaces with the electromechanical conversion element, a driving member frictionally coupled to the working member, a driven member coupled to the driving member, and a driving pulse generating arrangement for causing expansion/contraction displacement to the electromechanical conversion element. In JP-A 9-191665, an internal barrel is integratedly and fixedly attached to a fixed lens barrel. The internal barrel has extensions which are formed in a radial direction on part of the internal barrel. A drive shaft (a moving portion) arranged parallel to an optical axis is supported by bearings of the extensions so as to be movable in the optical axis direction. A piezoelectric element (the electromechanical conversion element) is disposed between the working member (a vibration friction portion) and the extension of the internal barrel. The top half of the working member touches the drive shaft and a pad is installed on the bottom half of the working member and exerts a force toward the drive shaft via a spring, such that the pad touches the bottom half of the working member. The working member and the pad are friction-bonded to the drive shaft via a suitable friction force. By generating expansion/compression displacements having different rates in the thickness direction of the piezoelectric element, the working member is displaced, and the drive shaft is driven by friction contact with working member together with a lens holding frame serving as the driven member.

Japanese Unexamined Patent Application Publication No. 2006-113155 (JP-A 2006-113155) (which will be also called a sixth patent document) discloses a lens unit which is capable of being mounted on a compact portable terminal or the like. The lens unit disclosed in JP-A 2006-113155 comprises a housing, a barrel which holds a lens and which is capable of moving with respect to the housing, a driving device for driving the barrel with respect to the housing, and fastening means for fastening the driving device to the housing. The fastening means comprises a board mounted to the driving device, and a fastener for mounting the board to the housing by using a friction force producing on mounting it to a concave portion of the housing. The driving device comprises an electro-mechanical transducer mounted to the board together with a weight, and a driving member (a vibration friction portion) which is fixed to an end of the electro-mechanical transducer and which is coupled to the barrel so that the driving member is relatively movable to the barrel.

There are problems in the above-mentioned first through forth patent documents as follows.

In the driving device disclosed in the first patent document, inasmuch as the lens holder (the driven member, the moving portion) is movably supported to the guide bar (the driving member, the vibration friction portion) bonded to the piezoelectric element, the guide bar (the driving member, the vibration friction portion) has a length longer than that of the lens holder (the driven member, the moving portion) and the guide bar (the driving member, the vibration portion) is easy to produce an inclination caused by a reciprocating motion. In addition, the longer a moving distance of the lens holder (the driven member, the moving portion), the longer the guide bar (the driving member, the vibration friction member) and it results in easily producing an unnecessary vibration mode. Furthermore, inasmuch as the friction engagement portion lies on an extension of a coupling portion between the piezoelectric element and the guide bar (the driving member, the vibration friction member), it counts against a reduction in profile thereof.

In also the driving apparatus disclosed in the second patent document, inasmuch as the driving shaft (the driving member, the vibration friction portion) extends in an expansion/contraction direction of the electro-mechanical transducer, the driving shaft (the driving member, the vibration friction portion) has a length longer than that of the a zoom lens barrel (the driven member, the moving portion) and the driving shaft (the driving member, the vibration friction portion) is easy to produce an inclination caused by a reciprocating motion. In addition, the longer a moving distance of the zoom lens barrel (the driven member, the moving portion), the longer the driving shaft (the driving member, the vibration friction portion) and it results in easily producing an unnecessary vibration mode. Furthermore, inasmuch as the friction engagement portion lies on an extension of a coupling portion between the electro-mechanical transducer and the driving shaft (the driving member, the vibration friction member), it counts against a reduction in profile thereof. In addition, inasmuch as the driving apparatus has structure where the zoom lens barrel (the driven member, the moving portion) is cantilevered by the driving shaft (the driving member, the vibration friction portion), it is impossible to mechanically move a large weight object such as the lens.

The third patent document may just disclose the driving apparatus where the driving shaft (the driving member, the vibration friction portion) is made of the fiber-reinforced resin composite and has a basic structure which is similar to that illustrated in the second patent document. It has therefore disadvantage which is similar to that of the second patent document.

In addition, in each of the driving devices disclosed in the first through the third patent documents, the electro-mechanical transducer (the piezoelectric element) is directly adhesively-fixed to a supporting member (a supporting plate) without through a weight.

Although the driving member (the vibration friction portion) has a length which is shorter than that of the driven member (the moving portion) in the actuator disclosed in the fourth patent document, the actuator disclosed in the fourth patent document is disadvantageous in that it is complicated in structure and it is impossible to reduce a size thereof because it comprises a plurality of piezoelectric elements.

On the other hand, the fifth patent document discloses the linear drive mechanism where the moving member (the moving portion) has a rod shape and the working member (a vibration friction portion) has a complicated shape. However, the fifth patent document merely discloses the linear drive mechanism where the piezoelectric element is directly adhesively-fixed to the extensions of the internal barrel.

The sixth patent document discloses the lens unit comprising the fastening means for fastening the driving device to the housing. In the sixth patent document, the board composing the fastening means is for fastening the driving device to the housing and does not lie between the weight and the housing. In other words, the board is not used as an elastic member.

On the other hand, if the static member is directly adhesively-fixed to the cabinet, there are problems as follows. As a material of the static member, generally, tungsten having high density and high Yang's modulus is used. When the static member is directly fixed to the cabinet, a resonance frequency of the driving device reduces to a value which is equivalent to that of the driving device comprising two members of the electro-mechanical transducer and the vibration friction portion which have density and Yang's modulus lower than those of the static member. Although an operation frequency of the driving device is normally set about 60 kHz, it is necessary to sufficiently separate the resonance frequency of the driving device from the operation frequency thereof in order to obtain a stable frequency characteristic. However, it is difficult to separate the resonance frequency of the driving device from the operation frequency thereof when the static member is directly adhesively-fixed to the cabinet. Accordingly, it is impossible to obtain the stable frequency characteristic.

SUMMARY OF THE INVENTION

It is therefore an exemplary object of the present invention to provide a driving device which is capable of obtaining a stable frequency characteristic thereof.

Other objects of this invention will become clear as the description proceeds.

On describing the gist of an exemplary aspect of this invention, it is possible to be understood that a driving device includes an electro-mechanical transducer having first and second end portions opposite to each other in an expansion/contraction direction, a static member coupled to the first end portion of the electro-mechanical transducer, a vibration friction portion coupled to the second end portion of the electro-mechanical transducer, and a rod-shaped moving portion frictionally coupled to the vibration friction portion. The rod-shaped moving portion is movable in the expansion/contraction direction of the electro-mechanical transducer. According to the exemplary aspect of this invention, the driving device includes a cabinet for covering the driving device and an elastic member lying between the cabinet and the static member.

DESCRIPTION OF THE PREFERRED EMBODIMENTS

Figure 1:
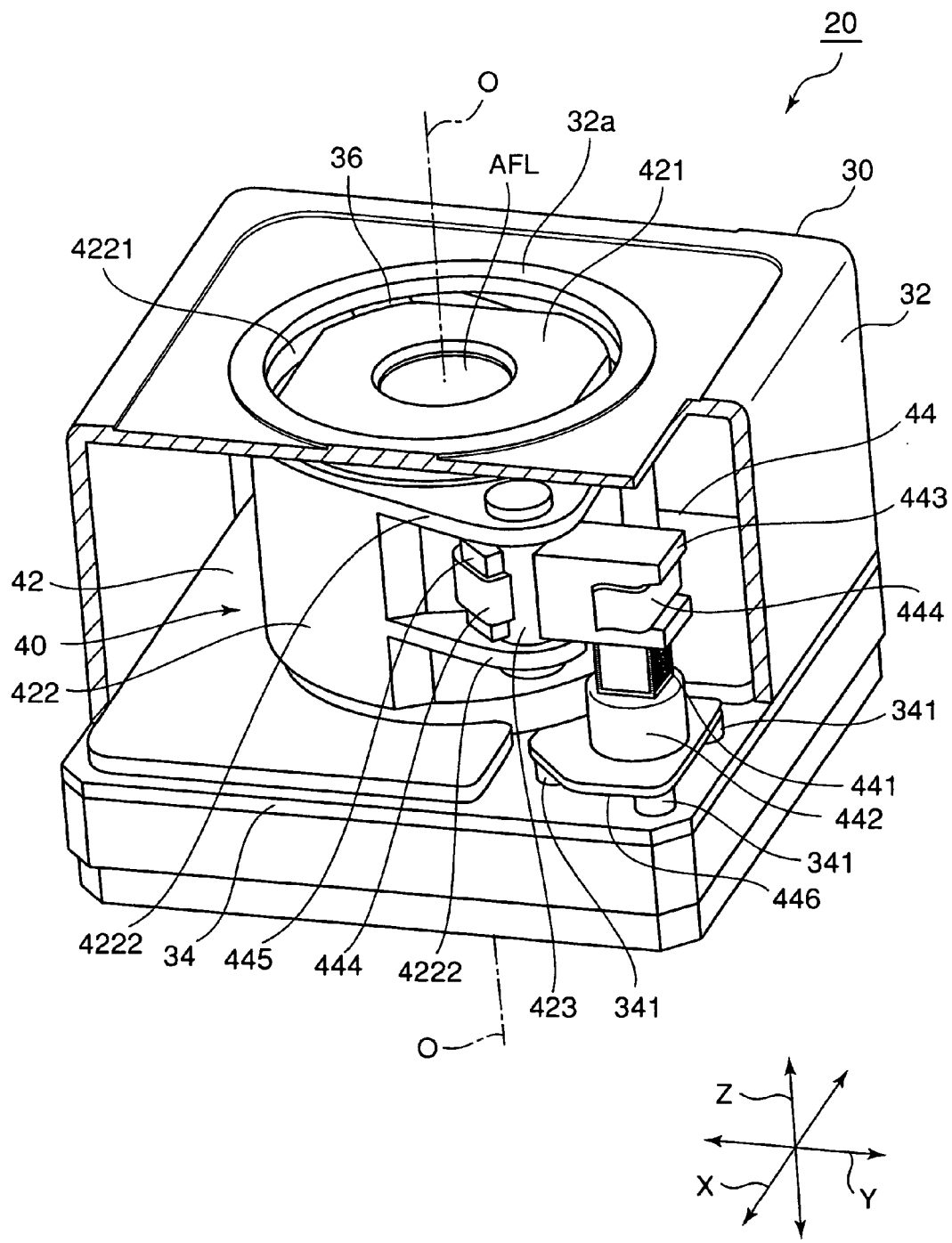
FIG. 1 is a partial cross sectional perspective view of a driving device according to a first exemplary embodiment of this invention.
Figure 2:
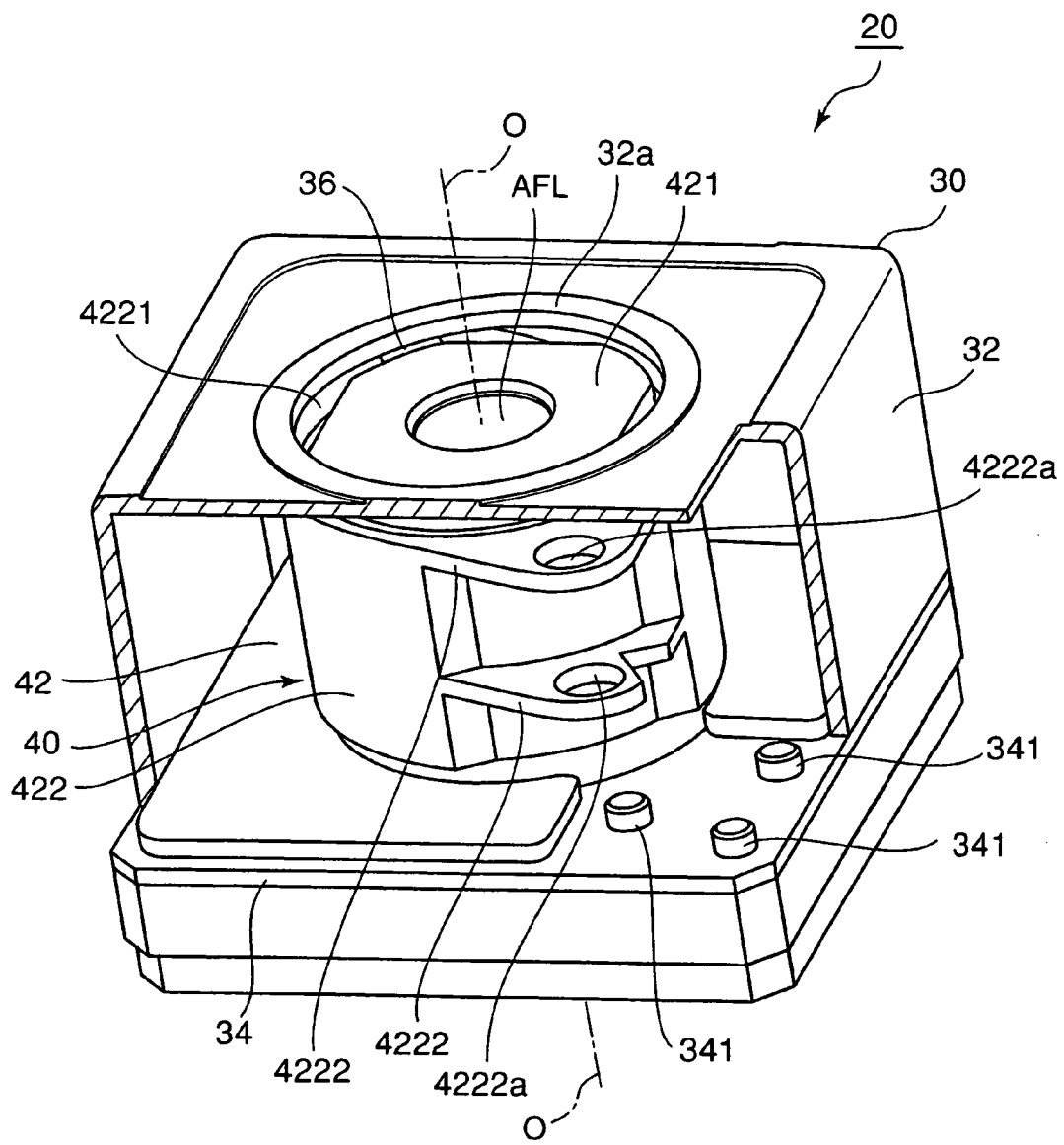
FIG. 2 is a partial cross sectional perspective view of the driving device illustrated in FIG. 1 with a lens driving portion of an auto-focus lens driving unit and a rod-shaped moving portion removed therefrom.
Figure 3:
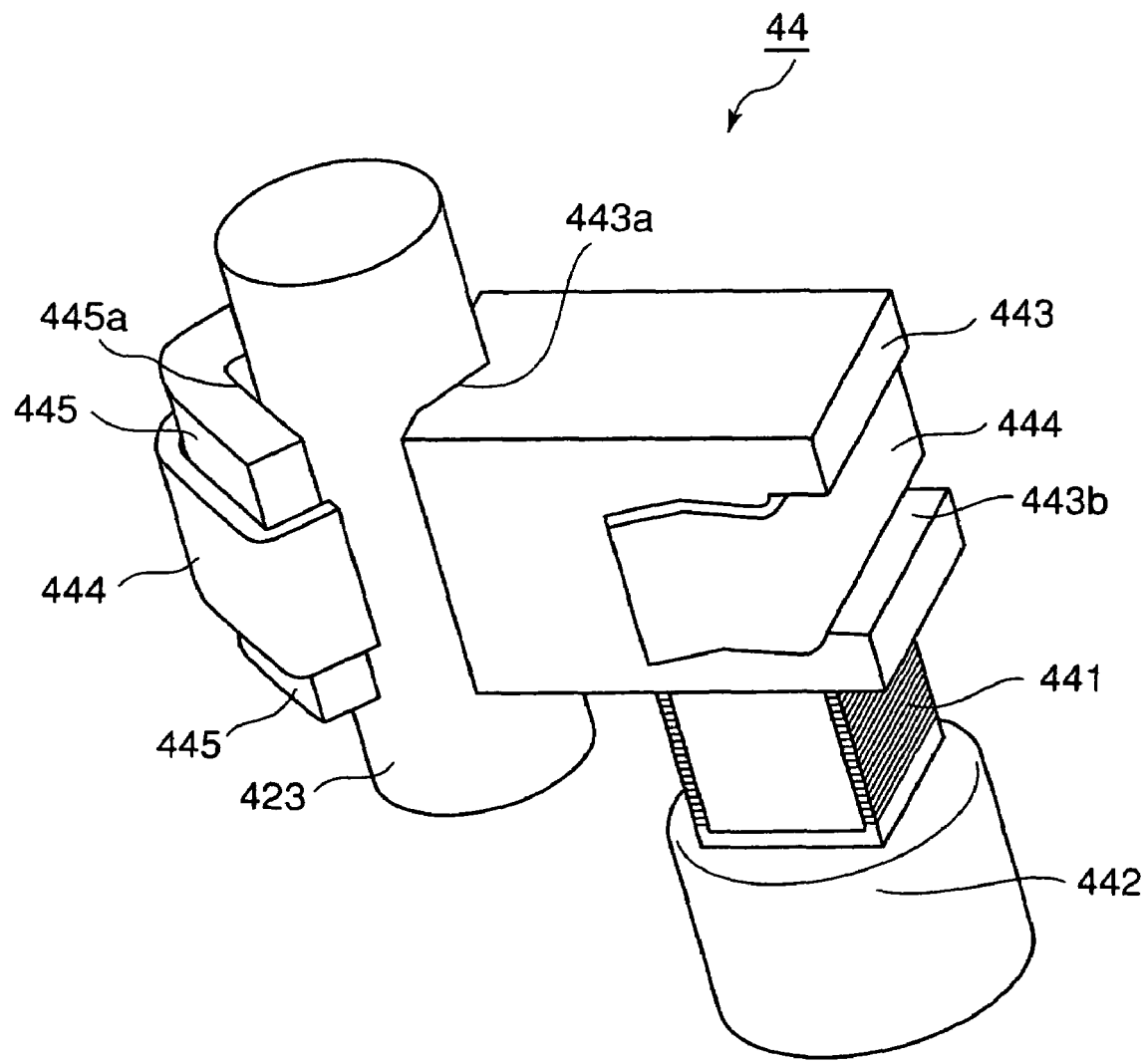
FIG. 3 is a perspective view of the lens driving portion of the auto-focus lens driving unit together with the rod-shaped moving shaft.
Figure 4:
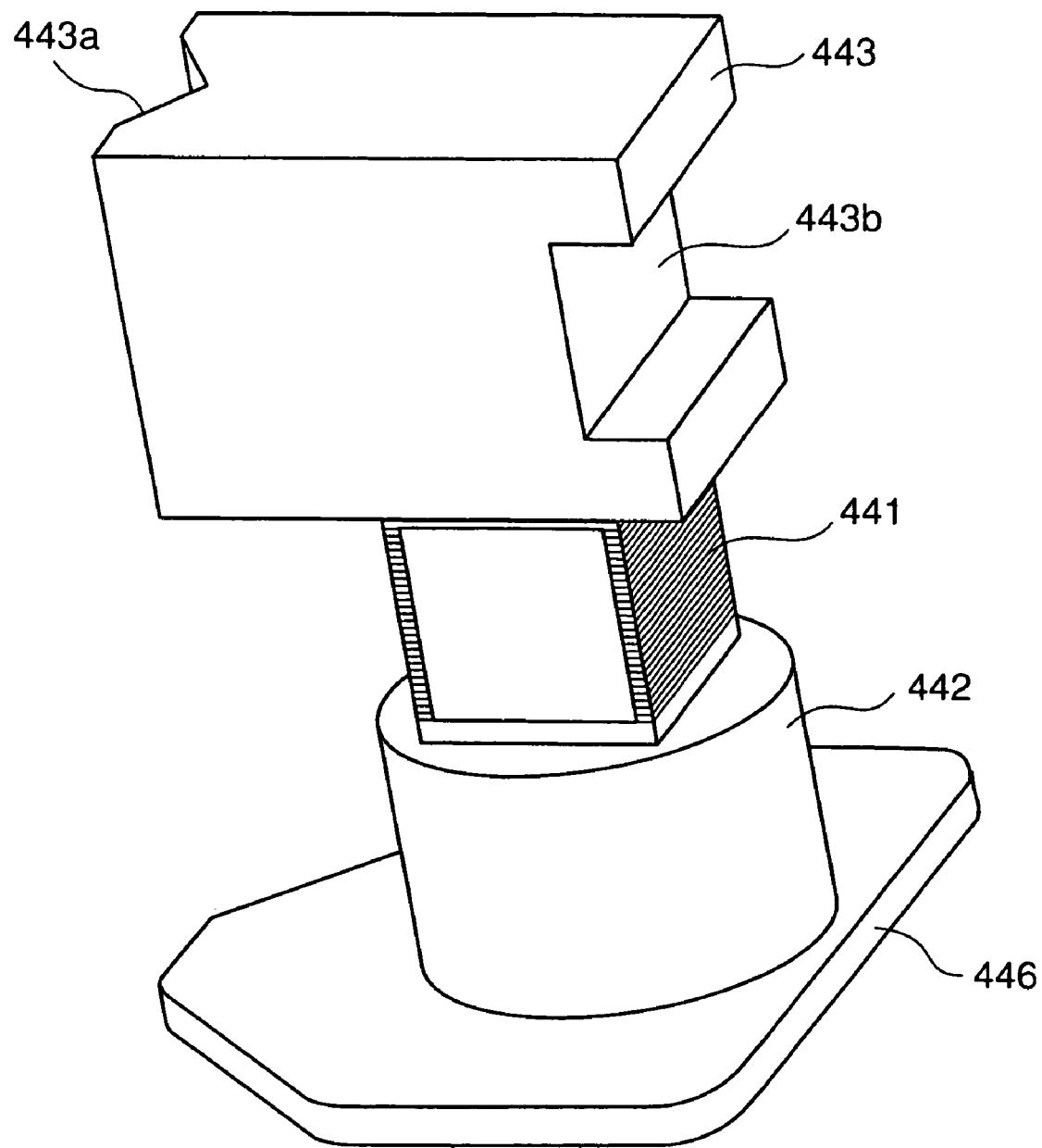
FIG. 4 is a perspective view of a main portion of the lens driving portion of the auto-focus lens driving unit illustrated in FIG. 3 together with a sheet metal (an elastic member)
Figure 4:
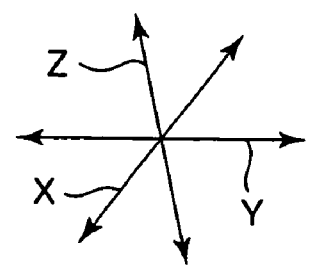
Figure 5:
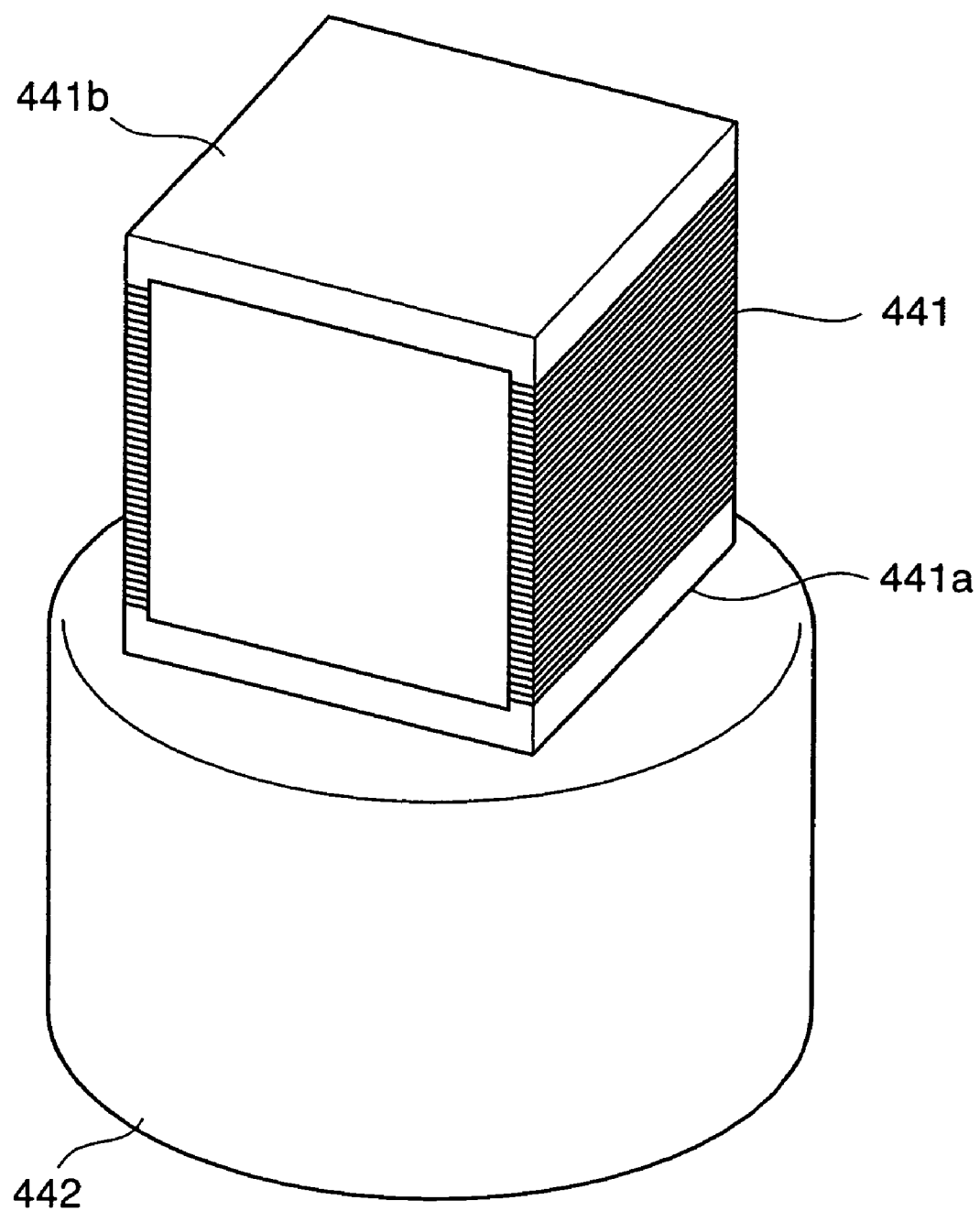
FIG. 5 is a perspective view of a piezoelectric unit for use in the lens driving portion illustrated in FIG. 3.

Referring to FIGS. 1 though 5, the description will proceed to a driving device 20 according to a first exemplary embodiment of this invention. FIG. 1 is a partial cross sectional perspective view of the driving device 20 according to the first exemplary embodiment of this invention. FIG. 2 is a partial cross sectional perspective view of the driving device 20 illustrated in FIG. 1 with a lens driving portion 44 of an auto-focus lens driving unit 40 and a rod-shaped moving portion 423 removed therefrom. FIG. 3 is a perspective view of the lens driving portion 44 of the auto-focus lens driving unit 40 together with the rod-shaped moving shaft 423. FIG. 4 is a perspective view of a main portion of the lens driving portion 44 of the auto-focus lens driving unit 40 illustrated in FIG. 3 together with a sheet metal (an elastic member) 446. FIG. 5 is a perspective view of a piezoelectric unit for use in the lens driving portion 44 illustrated in FIG. 3.

Herein, in the manner shown in FIGS. 1 to 4, an orthogonal coordinate system (X, Y, Z) is used. In a state illustrated in FIGS. 1 to 4, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 to 4, the up-and-down direction Z is a direction of an optical axis O of a lens.

As shown in FIG. 1, the driving device 20 is covered with the cabinet (the outer sheath) 30 having a substantially rectangular parallelepiped shape. In the cabinet (the outer sheath) 30, the auto-focus lens driving unit 40 which will later be described is disposed. The cabinet (the outer sheath) 30 includes a cap-shaped upper cover 32 and a lower base 34. On the lower base 34 of the cabinet 30, a static member (a weight) 442 is mounted through the sheet metal 446 in the manner which will later be described. The upper cover 32 has an upper surface comprising a cylinder portion 32a having a center axis which is the optical axis O.

On the other hand, although illustration is not made, the lower base 34 had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

As shown in FIG. 2, the lower base 34 comprises three protrusions 341 for mounting the sheet metal (the elastic member) 446 thereon. That is, on the three protrusions 341, the sheet metal 446 is fixed using an adhesive agent. In other words, the sheet metal 446 is in contact with the cabinet 30 through the three protrusions 341. Accordingly, the sheet metal (the elastic member) 446 is disposed so as to be apart from the cabinet 30 by a predetermined distance and is fixed to the static member 442. In the example being illustrated, the sheet metal 446 comprises stainless steel (SUS) having a thickness of about 0.1 mm.

In the cabinet (the outer sheath) 30, a guide shaft 36 is disposed at a left and back side. The guide shaft 36 extends in parallel with the optical axis O. The guide shaft 36 stands on the lower base 34 of the cabinet 30. With the optical axis O sandwiched, the rod-shaped moving portion (a movable shaft) 423, which will later be described, is disposed at a right and front side which is opposite side with respect to the guide shaft 36. That is, the guide shaft 36 and the moving shaft 423 are disposed at positions which are rotationally symmetric about the optical axis O.

The auto-focus lens driving unit 40 comprises a lens movable portion 42 and the lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIGS. 1 to 2) 4221 which extend in a radial direction outwards at the left and back side. The pair of extending portions 4221 have through holes (not shown) through which the above-mentioned guide shaft 36 passes. In addition, the movable barrel 422 comprises a pair of extending portions 4222 which extend in the radial direction outwards at the right and front side. The pair of extending portions 4222 have fitting holes through which the rod-shaped movable shaft 423 passes and to which the rod-shaped moving shaft 423 is fixed. With this structure, the lens movable portion 42 is movable in the direction of the optical axis O with respect to the cabinet 30.

The lens driving portion 44 slidably supports the lens movable portion 42 in the direction of the optical axis O and drives the lens movable portion 42 in the manner which will later be described.

Referring to FIG. 3, the description will proceed to the lens driving portion 44 of the auto-focus lens driving unit 40.

The lens driving portion 44 comprises a laminated piezoelectric element 441 serving as an electro-mechanical transducer, the static member (the weight) 442, and a vibration friction portion 443. The laminated piezoelectric element 441 has a structure where a plurality of piezoelectric layers are laminated in the optical direction O. As shown in FIG. 5, the laminated piezoelectric element 441 has a first end portion (a lower end portion) 441a and a second end portion (an upper end portion) 441b which are disposed to each other in the expansion/contraction direction. The static member (the weight) 442 is coupled to the first end portion (the lower end portion) 441a of the laminated piezoelectric element 441 using an adhesive agent or the like. The vibration friction portion 443 is coupled to the second end portion (the upper end portion) 441b of the laminated piezoelectric element 441 using the adhesive agent or the like.

In addition, as shown in FIG. 5, a combination of the laminated piezoelectric element 441 and the static member 442 is called the piezoelectric unit.

The rod-shaped moving shaft 423 is frictionally coupled to the vibration friction portion 443. The vibration friction portion 443 has a groove 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a V-shape in cross section at a contact portion between the pad 445 and the rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

The lens driving portion 44 and the lens moving portion 42 are disposed in parallel with each other in the optical axis O as shown in FIG. 1. Accordingly, it is possible to lower a height of the auto-focus lens driving unit 40. As a result, it is possible to also lower a height of the driving device 20.

Figures 6A, 6B:
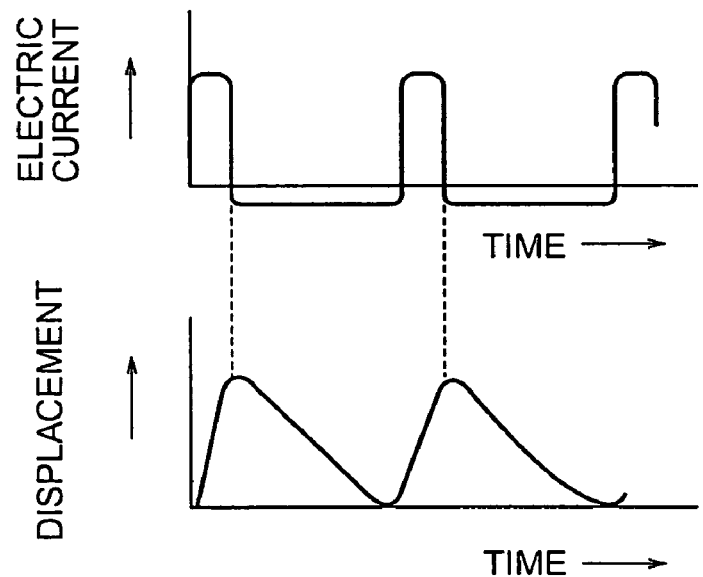
FIG. 6A is a waveform diagram for use in describing a current supplied to a laminated piezoelectric element.
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(a) and 8(b) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce a sawtooth displacements (expansion and contraction) (FIG. 6B).

Referring to FIG. 1 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-and-down direction Z) upwards. In this event, the lens movable portion 42 does not moves. This is because, caused by the inertial force, the lens movable portion 42 substantially remains in its position by overcoming the friction force between the vibration friction portion 443 and the rod-shaped moving shaft 423.

Subsequently, it will be assumed that the constant current flows the laminated piezoelectric element 441 in the negative or reverse direction as shown in FIG. 6A. In this event, the laminated piezoelectric element 441 slowly produces the contraction displacement in the thickness direction as shown in FIG. 6B. As a result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

The following Table 1 shows resonance frequencies of the auto-focus lens driving unit 40 (the driving device 20) in a case where the static member 441 is directly fixed to the cabinet 30 in the manner as a related art (which will be called a "direct fixing") and in a case where the static member 441 is indirectly fixed to the cabinet 30 through the elastic member 446 in the manner as the present invention (which will be called an "indirect fixing"). In addition, Table 1 shows the resonance frequencies at each resonance order by simulation on the direct fixing and the indirect fixing.

TABLE 1

| RESONANCE ORDER | DIRECT FIXING kHz | INDIRECT FIXING kHz |
|---|---|---|
| 1 | 112.1 | 200.6 |
| 2 | 112.5 | 202.4 |
| 3 | 211.7 | 230.1 |
| 4 | 379.4 | 470 |

From the above-mentioned Table 1, it is seen that the indirect fixing has higher resonance frequencies of the respective resonance orders than that of the direct fixing.

In the manner which is described, inasmuch as the driving device 20 has the operation frequency which is equal to about 60 kHz, a value of a first-order resonance frequency is an issue. From the Table 1, the indirect fixing has the first-order resonance frequency which is vastly higher than the operation frequency in comparison with the direct fixing. Accordingly, the frequency characteristic about the operation frequency is stable in the indirect fixing as compared with the direct fixing. Unevenness in performance of the driving device 20 each product is ascribable to errors in dimension of the vibration friction portion 443 and the electro-mechanical transducer 441 based on design values, characteristic unevenness of the electro-mechanical transducer 441 on manufacturing, assembling unevenness of the driving device 20, and so on. Although there is a shift of the resonance frequencies caused by the unevenness in performance of the driving device 20 each produce, it has little effect on performance of the driving device 20 such as an amplitude (a moving width of the vibration friction member when the electro-mechanical transducer expands and contracts), and so on.

In addition, it is possible to adjust the resonance frequencies of the driving device 20 by making a modification of a material, a thickness, and a shape of the sheet metal (the elastic member) 446.

Figure 7:
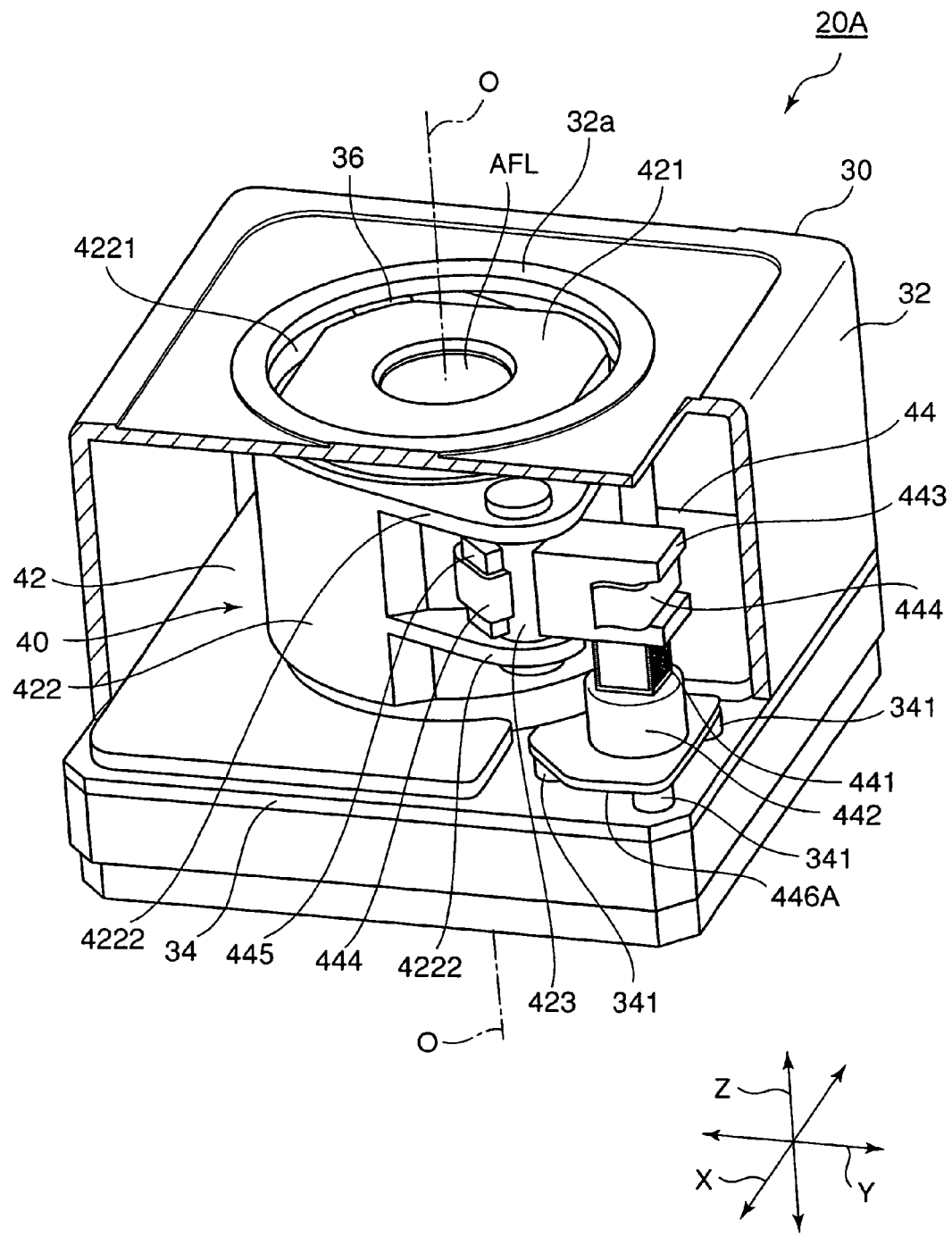
FIG. 7 is a partial cross sectional perspective view of a driving device according to a second exemplary embodiment of this invention.

Referring to FIG. 7, the description will proceed to a driving device 20A according to a second exemplary embodiment of this invention. FIG. 7 is a partial cross sectional perspective view of the driving device 20A according to the second exemplary embodiment of this invention.

Herein again, in the manner shown in FIG. 7, an orthogonal coordinate system (X, Y, Z) is used. In a state illustrated in FIG. 7, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 7, the up-and-down direction Z is a direction of an optical axis O of a lens.

The illustrated driving device 20A is similar in structure to the driving device 20 illustrated in FIGS. 1 to 5 except that the elastic member is different from that illustrated in FIGS. 1 to 5 as will later become clear. Accordingly, the elastic member is therefore depicted at 446A. In addition, the same reference symbols are attached to those which are similar to parts (components) of the driving device 20 illustrated in FIGS. 1 to 5 and description will be made as regards different points.

The elastic member 446A is made of rubber. With this structure, it is possible to obtain a stable frequency characteristic of the driving device 20A.

If the rubber constituting the elastic member 446A is made of a soft or flexible material, the three protrusions 341 may be omitted from the driving device 20A. In this event, the elastic member 446A made of rubber lies between the static member 441 and the lower base 34.

Figure 8:
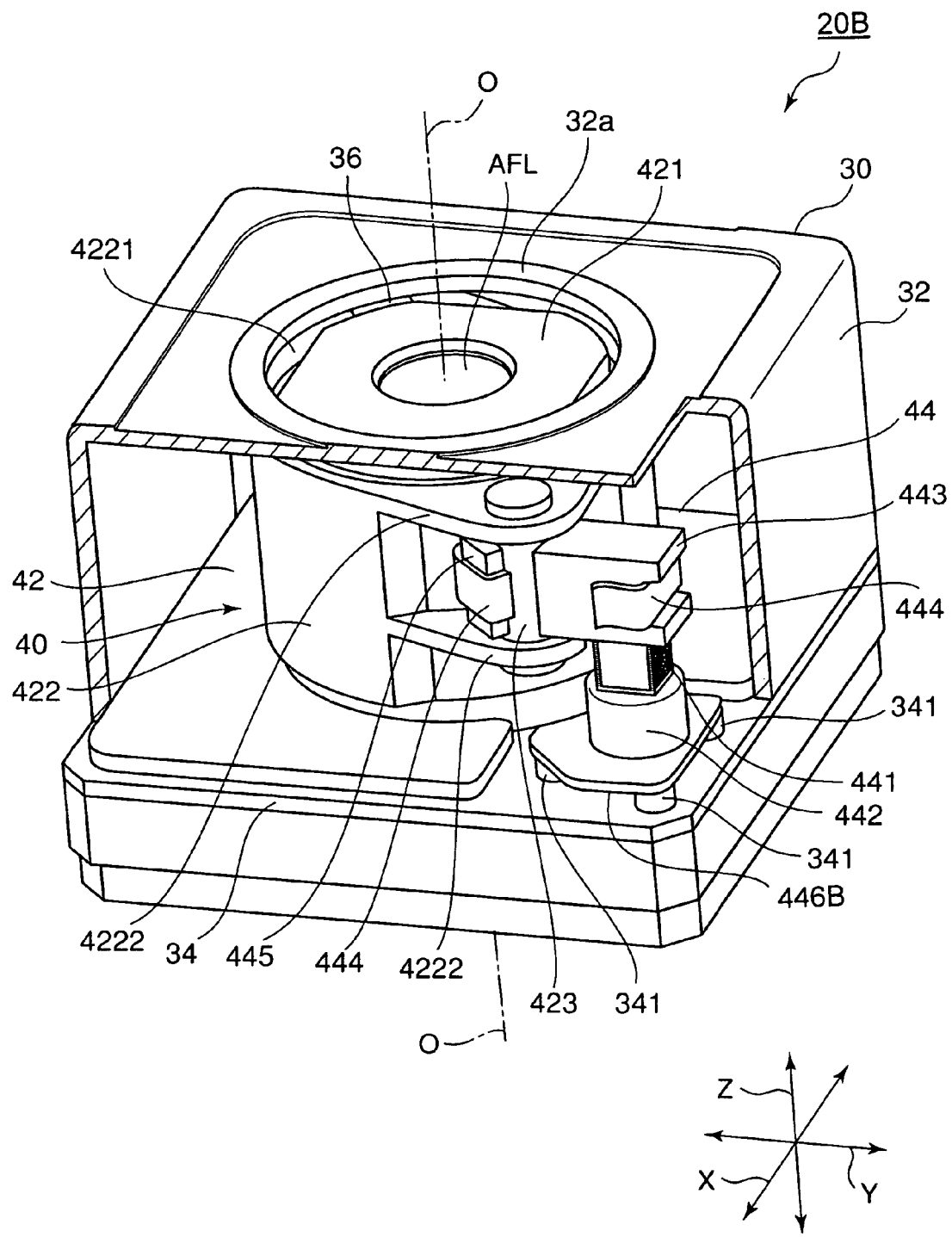
FIG. 8 is a partial cross sectional perspective view of a driving device according to a third exemplary embodiment of this invention.

Referring to FIG. 8, the description will proceed to a driving device 20B according to a third exemplary embodiment of this invention. FIG. 8 is a partial cross sectional perspective view of the driving device 20B according to the third exemplary embodiment of this invention.

Herein again, in the manner shown in FIG. 8, an orthogonal coordinate system (X, Y, Z) is used. In a state illustrated in FIG. 8, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 8, the up-and-down direction Z is a direction of an optical axis O of a lens.

The illustrated driving device 20B is similar in structure to the driving device 20 illustrated in FIGS. 1 to 5 except that the attitude retaining arrangement is different from that illustrated in FIGS. 1 to 5 as will later become clear. Accordingly, the elastic member is therefore depicted at 446B. In addition, the same reference symbols are attached to those which are similar to parts (components) of the driving device 20 illustrated in FIGS. 1 to 5 and description will be made as regards different points.

The elastic member 446B is made of sponge. With this structure, it is possible to obtain a stable frequency characteristic of the driving device 20B.

If the sponge constituting the elastic member 446B is soft, the three protrusions 341 may be omitted from the driving device 20B. In this event, the elastic member 446A made of sponge lies between the static member 441 and the lower base 34.

In the exemplary aspect of this invention, the elastic member is made of a material causing elastic deformation. The elastic member, for example, may be disposed so as to be apart from the cabinet by a predetermined distance and the elastic member may comprise a sheet metal fixed to the static member. Alternatively, the elastic member may be made of rubber or sponge.

An exemplary advantage according to the invention is that it is possible to obtain a stable frequency characteristic of the driving device because the elastic member lies between the cabinet and the static member.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims. For example, although the elastic member 446, 446A, or 446B is fixed to the cabinet 30 by means of the adhesive agent in the exemplary embodiments, a fastening member is not restricted to this, the elastic member 446, 446B, 446B may be fixed to the cabinet 30 by screwing, hanging, or the like. In addition, contact between the cabinet 30 and the elastic member 446, 446A, or 446B is point contacts using the protrusion in the exemplary embodiments, this invention is not restricted to this and the contact may be a plane contact, a line contact, or the like. Although the elastic member 446, 446A, 446B has a plate shape in the above-mentioned exemplary embodiments, this invention is not restricted to this and the elastic member may have a complicated shape such as bending or the like.

What is claimed is:

1. A driving device comprising:
   an electro-mechanical transducer having first and second end portions opposite to each other in an expansion/contraction direction;
   a static member coupled to the first end portion of said electro-mechanical transducer;
   a vibration friction portion coupled to the second end portion of said electro-mechanical transducer;
   a rod-shaped moving portion frictionally coupled to said vibration friction portion, said moving portion being movable in the expansion/contraction direction of said electro-mechanical transducer;
   a cabinet for covering said driving device; and
   an elastic member lying between said cabinet and said static member.

2. The driving device as claimed in claim 1, wherein said elastic member is made of a material causing elastic deformation.

3. The driving device as claimed in claim 2, wherein said elastic member is disposed so as to be apart from said cabinet by a predetermined distance, said elastic member comprising a sheet metal fixed to said static member.

4. The driving device as claimed in claim 2, wherein said elastic member is made of rubber.

5. The driving device as claimed in claim 2, wherein said elastic member is made of sponge.

* * * * *